United States Patent [19]

Juergens

[11] Patent Number: 4,521,498
[45] Date of Patent: Jun. 4, 1985

[54] THROUGH-THE-PARTITION INTERCELL CONNECTION AND METHOD
[75] Inventor: Tristan D. Juergens, Conifer, Colo.
[73] Assignee: Gates Energy Products, Inc., Denver, Colo.
[21] Appl. No.: 400,775
[22] Filed: Jul. 22, 1982
[51] Int. Cl.³ .................................. H01M 10/34
[52] U.S. Cl. ...................... 429/59; 429/160; 429/161; 429/178
[58] Field of Search ............ 429/59, 160, 161, 178
[56] References Cited

U.S. PATENT DOCUMENTS

| 4,046,062 | 9/1977 | Matter | 29/623.1 |
| 4,346,151 | 8/1982 | Uba et al. | 429/160 |
| 4,376,156 | 3/1983 | Wheadan | 429/160 |
| 4,383,011 | 5/1983 | McClelland et al. | 429/160 |
| 4,423,123 | 12/1983 | Okamatsu | 429/160 |

FOREIGN PATENT DOCUMENTS

WO/80/024-
72 11/1980 PCT Int'l Appl. ................ 429/59

Primary Examiner—Charles F. LeFevour
Attorney, Agent, or Firm—C. H. Castleman, Jr.; H. W. Oberg, Jr.

[57] ABSTRACT

A through-the-wall intercell connection for adjacent cells of a battery in which integral extensions of the current collector tabs emanating from the respective plates are directly welded together at the partition opening. The individual tabs are bent along a smooth curve which, together with interposed cushioned insulating material between bent tabs, lends vibration resistance to the intercell connection.

4 Claims, 6 Drawing Figures

4,521,498

THROUGH-THE-PARTITION INTERCELL CONNECTION AND METHOD

BACKGROUND OF THE INVENTION

This invention relates to intercell connections for rechargeable batteries and a method for producing the same, and particularly to through-the-wall intercell connections for maintenance-free sealed rechargeable lead-acid batteries of the absorbed electrolyte type.

Various through-the-partition connections have been employed in lead-acid batteries, but the predominant design employs separate cast-on straps which are burned or case onto the collector tabs of the plates of adjacent cells, and integral upstanding lugs connected to the respective straps are fused together through an opening in the partition. Typical constructions and methods for achieving fused intercell connections of this type are disclosed in U.S. Pat. No. 3,897,269 to Sabatino et al. and U.S. Pat. No. 4,046,062 to Matter et al. In the latter patent, FIG. 5, there is also shown a direct collector tab through-the-wall-connection in which the normal connecting strap and upstanding lug are eliminated. The present invention represents a refinement over this latter design (which to Applicant's knowledge has never been commercialized), and in particular comprehends a design and method adapted to sealed recombining lead-acid batteries of the absorbed electrolyte type capable of charge or discharge in any attitude without electrolyte loss, see U.S. Pat. No. 3,862,861 to McClelland et al. The design of the intercell connection of the invention is especially resistant to vibrational forces which sealed lead-acid batteries of the absorbed electrolyte type may be subjected to in use.

Batteries of the recombining type employing a common gas space interconnecting the cells have heretofore employed over-the-wall connectors enshrouded in an acid creep resistant coating or sleeve, e.g., as shown in commonly assigned U.S. Application Ser. No. 221,226 filed Dec. 29, 1980, now U.S. Pat. No. 4,383,011. See also U.S. Pat. Nos. 2,742,520 to Pucher et al. and 3,846,175 to Desai and U. K. Pat. No. 1,065,494.

SUMMARY OF THE INVENTION

In one aspect, the invention comprehends a rechargeable battery having a container, an insulating partition dividing the container into at least two cell compartments, cell packs comprised of positive plate(s), negative plate(s) and interposed separator fitted in the compartments, the partition being provided with an opening, and a through-the-partition intercell connection comprised respectively of a plurality of current collector tabs integral with the positive plate(s) of a cell pack of one compartment and a plurality of current collector tabs integral with a negative plate(s) of a cell pack of the adjoining cell compartment fused together at such opening. The improvement in particular comprises the feature of the current collector tabs which emanate from the positive and negative plates being respectively bent toward the opening along a substantially smooth curve forming a bend angle with its corresponding plate of less than about 80°, with insulator material interposed between adjacent current collector tabs along such curve.

In another aspect, the invention pertains generally to the above combination in which the partition is not sealed to a top portion of the container (so as to define a common gas space), the cells individually having electrolyte fully absorbed within the plates and separators of each cell pack, the intercell connection providing a sealed electrical connection resistant to acid creep between cells.

In another aspect, the invention is drawn to a method of making a rechargeable battery including the steps of: providing an open top container having an insulator partition dividing the container into at least two cell compartments, the partition being provided with an opening; inserting cell packs comprised of positive plates(s), negative plate(s) and interposed separator into said compartments, said plates being provided with a plurality of elongated current collector tabs formed of malleable material, and said separator extending beyond the edges of said plates; bending collector tabs of opposite polarity from adjacent cell compartments toward their mutual partition into position opposite the opening thereof, the tabs assuming a substantially smooth curve forming a bend angle with its corresponding plate of less than about 80°, and extended portions of said separator being sandwiched between adjacent tabs along such curved portion(s); and compressing the bent tabs together through the opening and passing an electric current therethrough to weld the same together to form a fused intercell connection.

BRIEF DESCRIPTION OF THE DRAWINGS

Preferred embodiments of the invention will be illustrated in conjunction with the accompanying drawings, in which like numerals designate like parts, and in which.

PREFERRED EMBODIMENTS OF THE INVENTION

Figure 1:
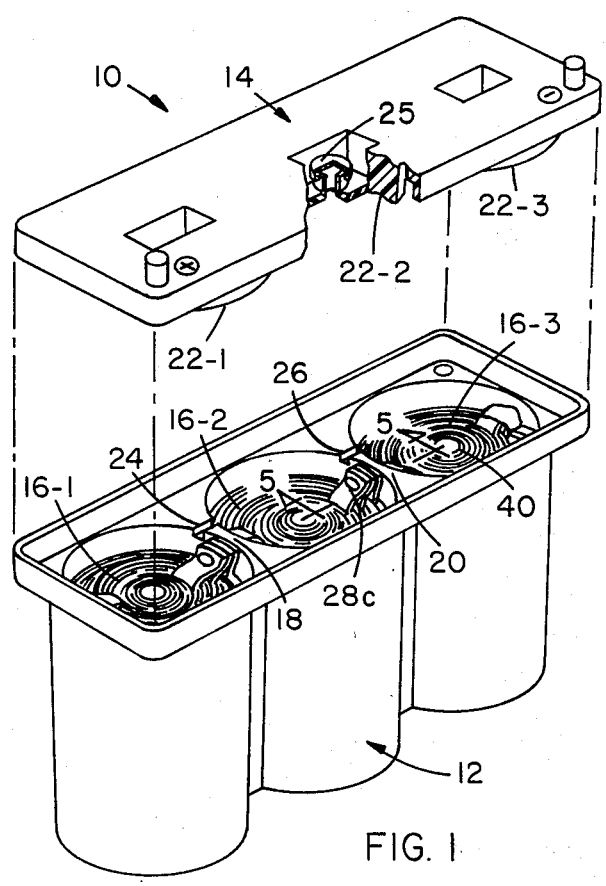
FIG. 1 is a perspective, exploded view of a battery made in accordance with the invention.

Referring first to the embodiment of FIG. 1, there is shown generally at 10, as an example, a one by three 6-volt cylindrically wound lead-acid battery housed in an open-mouth monobloc container 12, the mouth of which is sealed by lid 14, to produce a gas and electrolyte-tight battery. Monobloc container 12 is divided into three cylindrical bore compartments each housing a spirally wound cell pack element 16-1, -2 and -3. The respective bores make tangential contact to define intercell partitions 18, 20. The entire monobloc including the intercell partitions may be made of any suitable insulating and acid resistant material of sufficient strength to withstand internal gas pressure, such as polypropylene.

Top 14 is preferably provided with recessed protuberances 22-1, -2 and -3 which bear down substantially on the upper portion of each of the wound cell packs 16-1, 16-2 and 16-3 to provide resistance to vibrational forces, as disclosed in commonly assigned copending U.S. Applications Ser. No. 221,226 and Ser. No. 221,227 (now U.S. Pat. No. 4,346,151) both filed Dec. 29, 1980.

Each of the intercell partitions 18, 20 is preferably not sealed to top 14, whereby a common gas space or manifold is formed thereabove which interconnects all of the cells. While this common gas space is sealed from the exterior of the battery a resealable safety valve 25, e.g., of the Bunsen type, is provided in communication with the gas space to release gas when experiencing internal pressures above a predetermined superatmospheric valve releasing pressure. Passageways (notches) 24, 26 may be provided to ensure an effective intercommunication of gas between the various cells. The advantages of the common gas space sealed recombining lead-acid battery are more fully taught in the aforementioned U.S. Ser. No. 221,226, which is hereby incorporated by reference. Although the intercell partitions carry notches 24, 26 for this purpose it may be preferable to form the notches in cover member 14 instead, to lengthen the path and hence minimize the chance for intercell electrolyte creepage. In this respect the electrolyte path can be further lengthened by providing a serpentined notch surface e.g., chevron shaped, preferably in the cover.

The individual cell elements 16-1, 16-2 and 16-3 are typically constructed in accordance with the teaching of U.S. Pat. No. 3,862,861. The materials and arrangement of cell components are chosen to provide a battery capable of discharge and charge (including overcharge) in any attitude without electrolyte loss or significant intracell migration, and with the ability to recombine oxygen at high rates of efficiency.

Figure 6:
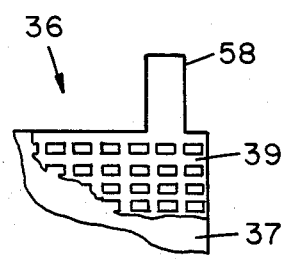
FIG. 6 is a partial cutaway of an electrode plate at the current collector tab.

As an example, the cells may be constructed by spirally winding together under tension thin flexible plates and interleaved compressible separators into a self-supporting roll of a dimension to more or less fit snugly within each of the bores of the monobloc. The positive and negative plates may be formed respectively of electrochemically active lead and compounds of lead which are formed into the conventional lead dioxide positive material and sponge lead negative material, applied as a paste 37 onto the grids 39 as shown in FIG. 6. The grids may be made of cast or wrought lead, for instance formed into a perforated sheet or expanded mesh. The lead used for the grid has a high hydrogen overvoltage and is preferably pure lead of least 99.9% by weight purity, with the impurities not serving to substantially reduce the hydrogen overvoltage, or an alloy of lead naturally having a high hydrogen overvoltage, such as lead/calcium, lead/calcium/tin, or the like.

Figure 3:
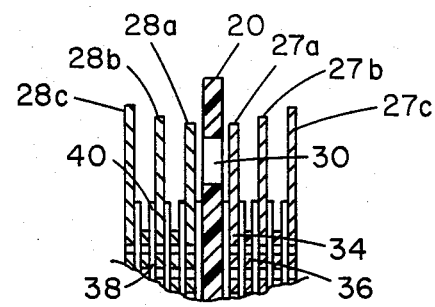
FIG. 3 is a sectioned elevational view of the battery components of cells 16-2 and 16-3 of FIG. 1 prior to carrying out the method of the invention.

As shown in FIG. 3, the grids are provided with integral current collector tab extensions 27a, b, c for the positive plate of cell pack 16-3, and negative tabs 28a, b, c for the negative plate of cell pack 16-2, respectively positioned opposite the intercell partition 20. These current collector tabs of adjoining cells are fused together through partition opening 30 forming welded connection 32 (see FIG. 5), serving to interconnect the cells in series relationship. The details and method of producing the weld will be described hereinafter.

It is preferred that the current collector tabs (and preferably the grid to which they are attached) be formed of a malleable, substantially deformable and soft material which facilitates bending of the tabs along a desired predetermined curvature. With lead materials it is preferred that the current collector tabs and grids are formed of the aforementioned high purity material or lower purity alloy which provides a resultant Brinell hardness (10 mm/31.2 kg −120 sec.) of less than about 10 kg/mm$^2$, and more preferably less than about 8 kg/mm$^2$. In addition to high purity lead, various lead-calcium alloys, e.g., containing 0.07 weight percent or less calcium, and lead-tin or lead-tin-calcium alloys containing preferably less than about 10 weight percent tin are generally sufficiently deformable. Typical antimonial lead containing as low as a few weight percent antimony does not fall within these preferred hardness ranges. In this respect, see *Lead and Lead Alloys*, Hoffmann, Springer-Verlag, Berlin-Heidelberg, 1970.

Between each positive plate 34 and negative plate 36 is sandwiched separator element 38 which extends beyond the edges of the plate at 40, as shown. In addition to preventing shorting between adjacent plates or collector tabs of one plate with the edges of an adjoining plate, separator extensions 40 also serve to cushion and retain the shape of the curved current collector tabs e.g., 27a, 27b, 27c emanating from a given polarity (positive) plate of a cell pack. For the sealed recombining type lead-acid battery, these separators 38 together with their extended portions 40 are compressible, highly absorptive of electrolyte (about 70–95 percent porosity) and are compressed against the faces of the plates. When a prescribed limited or "starved" amount (substantially less than the amount capable of being absorbed by the plates and separators) of electrolyte is introduced into the battery and becomes tightly absorbed within the plates and separator, the great absorptive power of the separator produces a wicking action whereby the bulk of the electrolyte becomes absorbed in the separator material. There is substantially no free unabsorbed electrolyte in the battery. A substantial portion of the pore volume of the plates remains unfilled with electrolyte (voided) more or less uniformly throughout the pore volume of the plates. The capillary equilibrium established also precludes the separator from being fully saturated, to allow evolved gas particularly oxygen to be transported directly through the separator channels in the gas phase to be recombined at the negative plate during overcharge. Preferred separator materials include fiber glass mats, the major portion of the fibers on a weight basis having diameters of less than one micron.

The film thickness of electrolyte on the active material surfaces as well as the fibers of the separator will tend to equalize or balance during overcharge as unrecombined oxygen evolved diffused through the common gas space via passages 24, 26 to recombine preferentially with a negative plate of a cell which has the least amount of electrolyte.

Because the welded or fused connection 32 at the intercell partitions forms a tight seal, electrolyte will be retained within its given cell and not tend to creep or migrate to an adjacent cell (independent of battery orientation). Previous battery constructions of the sealed recombining lead-acid type with a common gas space employed over-the-partition intercell connectors carrying a sleeve or coating of acid resistant material, or potting materials such as epoxy, to limit or prevent such intercell creepage. However, these known types are not as effective as a fused, direct through-the-wall type, nor do they have as low an impedance.

Figure 4:
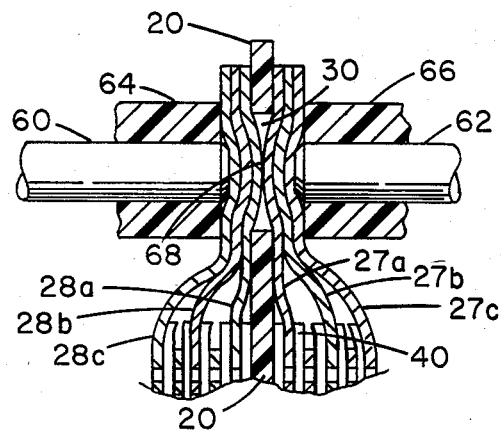
FIG. 4 is a partially sectioned elevational view showing an intermediate step of the method of the invention.
Figure 5:
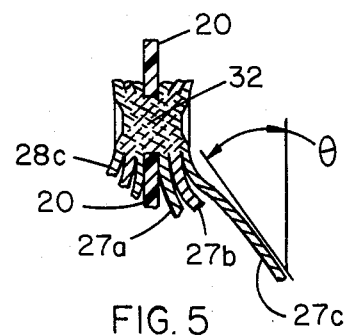
FIG. 5 is a partial view similar to FIG. 4, taken along 5—5 of FIG. 1, after completion of the welding step.

As seen best in FIGS. 4 and 5, the individual current collector tabs 27a, b, c emanating from the positive plate, and the corresponding tabs 28a, b, c emanating from the negative plate, on opposite sides of the common partition 20 are bent toward opening 30 and fused connection 32 along a substantially smooth curve for each tab, thereby forming a bend angle $\theta$ with the corresponding plate of each tab of preferably less than about 80°, more preferably less than about 60°, and most preferably less than about 45°. In combination therewith the aforementioned extended portions 40 of the separator or separate insulator material are interposed between adjacent current collector tabs, e.g., between 27b and 27c, along their respective curved portions. The smooth curve and relatively low bend angle are important in assuring that there are no abrupt bends which would provide stress points (characteristic of the construction of FIG. 5 of U.S. Pat. No. 4,046,062) which would be subject to stress craking upon vibration of the cell pack, particularly in a direction parallel to the intercell partition wall upon use of the battery. This can be a severe problem in certain applications of the battery where vibrational forces are prevalent, e.g., in lawnmower applications.

The use of current collector tabs formed of malleable, resilient material, when assuming the smooth bend curvature illustrated in FIGS. 4 and 5, provides load sharing and resilience to the connection, cushioned further by the extended separator portions 40, providing resistance to displacement even under high vibrational forces. The use of protuberances 22-1, -2, and -3 provided even additional support against the extended separator cushion 40, in this respect.

Figure 2:
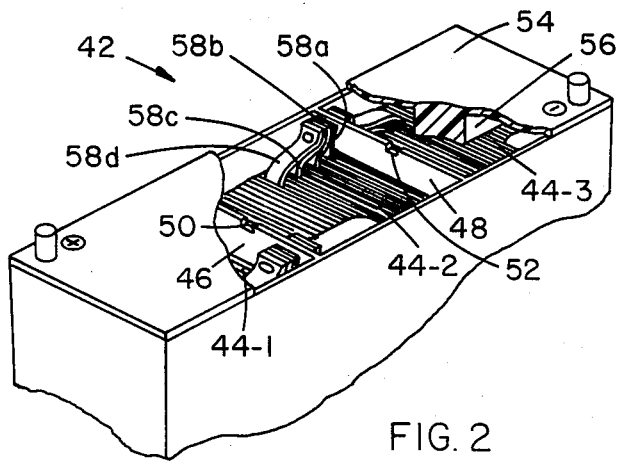
FIG. 2 is a partial cutaway perspective view of another battery configuration in accordance with the invention.

The embodiment of FIG. 2 is similar in most respects to that of FIG. 1 with the exception of the geometric configuration of the battery. In FIG. 2 a parallel plate or prismatic type of battery 42 is illustrated in which the plates and separators of each of cell compartment 44-1, 44-2 and 44-3 extend generally parallel to the two intercell partitions 46, 48. As with the embodiment of FIG. 1, the partitions (or cover 54) may be provided with openings e.g., 50, 52 to provide a common head space. The top element 54 is also provided with a resealable safety valve (not shown) and preferably includes a suitable protuberance 56 for each cell to resist displacement of each cell pack in response to vibrational forces.

In this embodiment each of the individual parallel plates of a given polarity has an associated tab, e.g., tabs 58a, b, c and d (additional tabs omitted for illustrative clarity) which is fused to adjoining tabs and to the tabs from the opposite polarity plate of cell pack 44-3 through an opening in partition 48, similar to the configuration illustrated in FIG. 5. Plates of a given polarity of a cell can be separate or continuous e.g., folded accordian style.

In accordance with the method of the invention, referring to FIGS. 3-5, the cell packs are first individually stuffed into their cell compartments, with the current collector tabs positioned adjacent opening 30 in partition 20. The tabs are preferably of greater length the farther they are positioned from the partition, e.g., tab 27b is greater in height than 27a, and 27c is greater in height than 27b, etc., so that the final height of each of the tabs after deformation and compression against the partition wall is approximately the same.

After the tabs are in the proper position as shown in FIG. 3, a pair of opposing electrodes 60, 62, respectively housed in appropriate (and conventional) non-conductive sleeves 64, 66, are displaced toward one another opposite opening 30. The sleeves 64, 66 together with the electrodes thus press the collector tabs into sealing engagement at the partition opening. While held in this position under a continual pressure, a portion of the collector tabs are extruded into the opening until actual contact at 68 is made between tabs 27a and 28a. At this time the lower portions of tabs 27a, b, c and 28a, b, c assume a substantially smooth curve (final shape) forming bend angle $\theta$ as shown, with the corresponding plate of less than about 80°. Furthermore, extended portion 40 of separator 38 is bent and sandwiched between such tabs, along the curved portions.

With the assembly positioned as shown in FIG. 4, electric current is passed through the electrodes using a standard resistance welding or equivalent apparatus, with the normal controls, water cooling and the like to effect heating and flow of the lead tab extensions within the opening of the partition and its vicinity. The melting of the tab results in further extrusion and fusion together of the lead under the continued influence of pressure from the electrodes and associated sleeves in the direction of the opening. After sufficient melting and fusion has taken place, the electric current is terminated and the electrodes held in place for a cooling period after which the electrodes are removed to provide the final fused connection 32 as shown in FIG. 5 (the omitted lower portion of which is identical to the corresponding portion of FIG. 4).

The squeeze, weld time, current amplitude and other parameters varied for proper resistance welding are well known to those skilled in the resistance welding art and do not form a part of the invention hereof.

While certain representative embodiments and details have been shown for the purpose of illustrating the invention, it will be apparent to those skilled in this art that various changes and modifications may be made therein without departing from the spirit or scope of the invention.

What is claimed is:

1. A sealed lead-acid gas recombining battery comprising a monobloc container having at least two substantially cylindrical cell compartments in close tangential proximity separated by an intercell partition, cell packs contained in a substantially snug fit within the compartments and comprising at least one positive plate and at least one negative separated from each other by a separator of compressible highly acid-absorbent material compressed against the plates, and an acid electrolyte substantially fully absorbed within the plates and separators of the cell, and the partition being provided with an aperture and a through-the-partition intercell connection comprised respectively of a plurality of malleable current collector tabs integral with the positive plate(s) of a cell pack of one compartment and a plurality of current collector tabs integral with the negative plates(s) of a cell pack of the adjoining cell compartment fused together at said aperture, said current collector tabs being formed of lead having a Brinell hardness (10 mm/31.2 kg–120 sec.) of less than about 10 kg/mm$^2$ and at least one of said tabs on each side of the partition being bent toward the aperture along a substantially smooth curve forming a bend angle with its corresponding plate of less that about 60°, and separator material being interposed between adjacent current collector tabs.

2. The battery of claim 1 wherein said cell packs are formed of a flexible positive plate, a flexible negative plate, and a flexible glass microfiber separator spirally wound together and wherein said electrolyte is present in a starved amount.

3. The battery of claim 1 wherein said intercell partition has side surfaces diverging from a narrowest isthmus portion, and said aperture penetrates said isthmus portion.

4. The battery of claim 3 wherein a notch is provided adjacent said isthmus portion in either of said intercell partition or in a cover portion sealed to the cylindrical cell compartments.

* * * * *